(12) United States Patent
Mackiewicz et al.

(10) Patent No.: US 8,366,205 B1
(45) Date of Patent: Feb. 5, 2013

(54) BLENDED HYDRAULIC BRAKE BOOSTER

(75) Inventors: John E. Mackiewicz, Niles, MI (US); William John Penninger, Niles, MI (US)

(73) Assignee: Robert Bosch GmbH, Suttgart (DE)

( * ) Notice: Subject to any disclaimer, the term of this patent is extended or adjusted under 35 U.S.C. 154(b) by 1161 days.

(21) Appl. No.: 12/244,023

(22) Filed: Oct. 2, 2008

(51) Int. Cl.
*B60T 8/44* (2006.01)

(52) U.S. Cl. .................................... 303/114.1; 188/359

(58) Field of Classification Search ............... 303/114.1; 188/358, 359; 60/547.1, 589, 554, 582
See application file for complete search history.

(56) References Cited

U.S. PATENT DOCUMENTS

| | | | |
|---|---|---|---|
| 4,441,319 A | 4/1984 | Brown | |
| 4,490,977 A | 1/1985 | Fulmer | |
| 4,514,981 A | 5/1985 | Brown et al. | |
| 4,665,701 A | 5/1987 | Bach | |
| 4,685,297 A | 8/1987 | Brown, Jr. | |
| 4,704,867 A | 11/1987 | Brown, Jr. | |
| 4,724,674 A | 2/1988 | Fulmer | |
| 4,736,588 A * | 4/1988 | Leiber | 60/550 |
| 5,036,665 A * | 8/1991 | Brown, Jr. | 60/550 |
| 5,526,731 A | 6/1996 | Hashida | |
| 5,927,074 A | 7/1999 | Nishii et al. | |
| 6,606,859 B1 | 8/2003 | Mackiewicz et al. | |
| 6,789,857 B2 * | 9/2004 | Kusano | 303/114.1 |
| 7,354,116 B2 | 4/2008 | Kusano | |
| 7,517,027 B2 * | 4/2009 | Aoki et al. | 303/114.1 |
| 7,992,387 B1 * | 8/2011 | Mackiewicz | 60/589 |
| 2003/0168909 A1 * | 9/2003 | Kusano | 303/114.1 |

* cited by examiner

*Primary Examiner* — Bradley King
(74) *Attorney, Agent, or Firm* — Maginot, Moore & Beck

(57) ABSTRACT

A brake booster wherein second and third pistons are separated within a bore of a master cylinder to define second and third chambers. Compensation valves control the flow fluid from a reservoir to the bore while a passage in the second piston connects the second chamber with the third chamber that is connected to the reservoir through an tilt valve that is held opened by pressurized fluid acting on a fourth piston. A control valve responds to a resiliently applied force from an input rod carried by the third piston to supply pressurized fluid to the brake system. In an event pressurized fluid is unavailable, a spring moves the fourth piston and a sixth spring to moves the tilt valve against a seat to seal the third chamber and create a hydraulic lock. Further movement of the third piston correspondingly moves the second piston to effect a manual brake application.

8 Claims, 4 Drawing Sheets

BLENDED HYDRAULIC BRAKE BOOSTER

BACKGROUND OF THE INVENTION

1. Field of the Invention

The present invention relates to a blended brake booster having a hydraulic lock during a manual brake application.

2. Description of the Related Art

The present invention is of a type hydraulic brake boosters referred to as a "full-power" brake booster, of which the following U.S. Pat. Nos. are considered to be typical: 4,441,319; 4,490,977; 4,514,981; 4,665,701; 4,685,297; 4,704,867; 4,724,674; 5,526,731, 5,927,074, 6,606,859 and 7,354,116. In such brake boosters, an accumulator is charged with fluid pressure and selectively activated through movement of a control valve by an input member to present pressurized fluid to an actuation chamber that acts on an actuation piston and is directly supplied to a first set of wheel brakes. The pressurized fluid acts on the actuation piston in to develop a force for moving a power piston in a master cylinder that pressurizes operational fluid that is presented to a second set of wheel brakes to effect a brake application. The operational pressure that is developed in the master cylinder is proportional to the force applied to the actuation piston and inversely proportional to the cross-sectional area of the power piston in the master cylinder for a given force applied to an input member by an operator to move the control valve. The resulting travel of the input member and brake pedal is proportional to the travel of the actuation piston in the master cylinder. Conversely, the travel of the power piston in the master cylinder is also proportional to the displacement of the fluid in the brake system at any given pressure and inversely proportional to the cross-sectional area of the actuation piston. Thus, the travel of the input member and brake pedal is inversely proportional to the cross-sectional area of the actuation piston. Given these facts, when brake blending is implemented during a brake application with such prior art structure, a pulsation may be felt by an operator on the input pedal.

SUMMARY OF THE INVENTION

The present invention provides structure for a brake booster in a brake system wherein an input pedal is not affected by the opening and closing of build and decay valves to effect traction control during a power brake application and wherein a hydraulic lock is produced during a manual brake application.

In more particular detail the brake booster has a housing with a first axial bore therein for receiving a first piston that is separated from the bottom of the axial bore by a first spring to define a first chamber, a second piston that is separated from the first piston by a second spring that holds the second piston against a first stop to define a second chamber and a third piston that is separated from the second piston by a third spring that urges the third piston against a second stop to define a third chamber. The first chamber is connected to a reservoir through a first inlet port and to a first set of wheel brakes through a first outlet port while the second chamber is connected to a second set of wheel brakes through a second outlet port and the third chamber that is connected to the reservoir through a second inlet port and to the second chamber through a passage in the second piston. The second piston has a second axial bore therein that is connected to a supply port source to receive pressurized fluid from a source, the second axial bore a control valve for controlling communication of the pressurized fluid presented to the supply port to the first passage as a function to an input force supplied by an actuator rod. The actuator rod is resiliently connected to the third piston and moves in response to a manual brake force applied to a pedal by an operator. During a brake application should a brake blending traction function be implemented, additional pressurized fluid may be added and subtracted to the pressurized fluid supplied to the first and second set of brakes, this adding and subtracting is compensated by the balancing of the force from the resiliently positioned input rod. Fluid communication with the reservoir is controlled by a poppet valve associated with the first inlet port and by a tilt valve associated with the second inlet port. The tilt valve is characterized by being held in an opened state by the position of the third piston in a rest position or by the pressurized fluid from the source acting on a compensation piston such that the third chamber remains connected to the reservoir during a power brake application resulting from the presentation of pressurized fluid to the second chamber while in an absence of pressurized fluid from the source the, a first compensation spring moves the compensation piston and a second compensation spring closes the tilt valve on movement of the third piston. When the tilt valve closes, the third chamber is sealed and a hydraulic lock is created such the fluid pressure developed by movement of the third piston by the manual brake force moves the second piston away from the first stop and correspondingly pressurizes fluid in the second chamber to effect a manual brake application.

An object of this invention is to provide blending of pressurized fluid developed in a master cylinder with additional pressurized fluid supplied by a traction control source during a power brake application without causing movement of an input brake pedal.

A further object of this invention resides in the development of a hydraulic lock in a master cylinder such that a manual brake application moves a control piston to develop pressurized fluid to effect a brake application.

BRIEF DESCRIPTION OF THE DRAWINGS

Corresponding reference characters indicate corresponding parts throughout the several drawing views and may be identified by the same reference number.

DETAILED DESCRIPTION OF THE INVENTION

Figure 1:
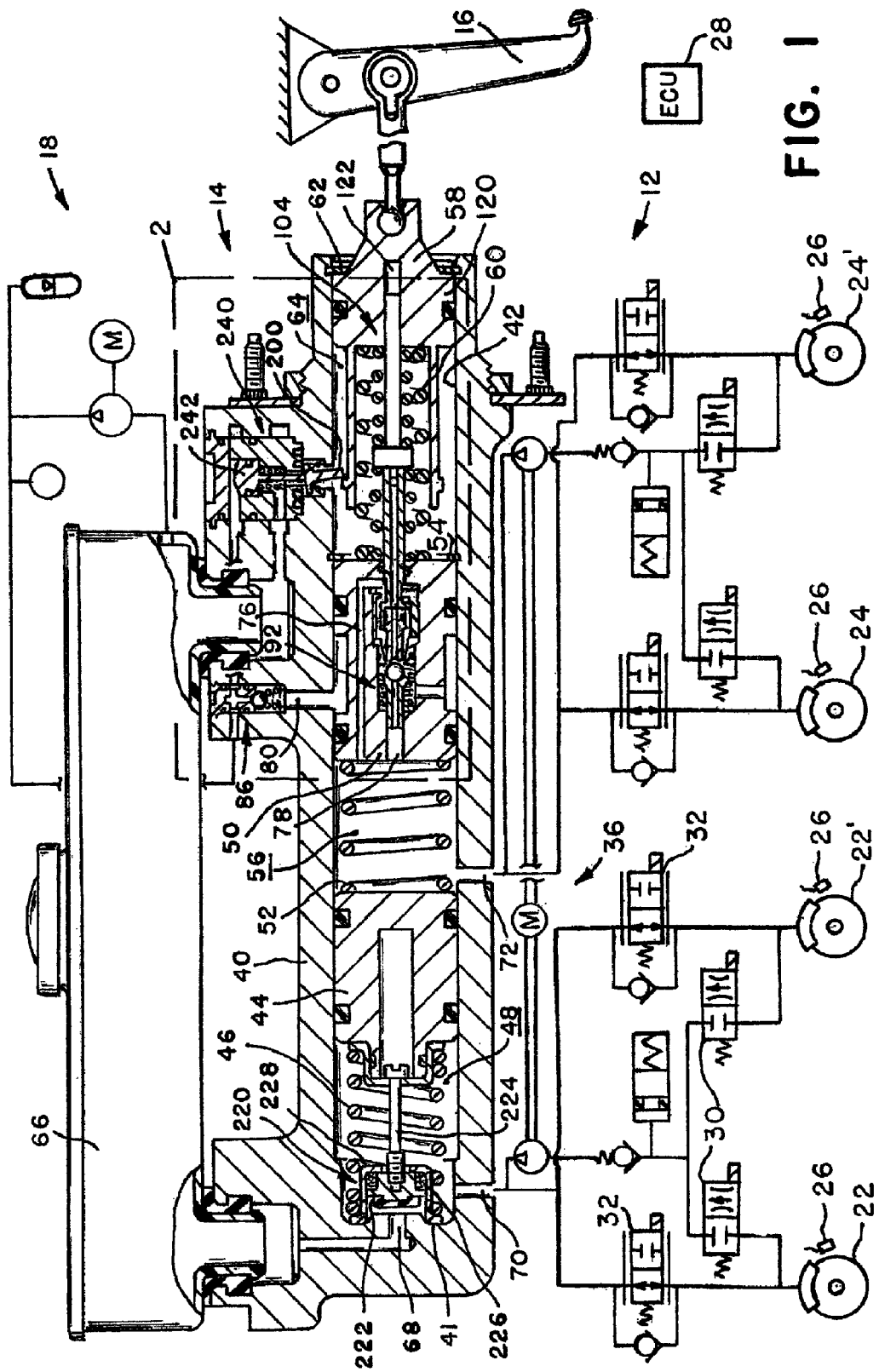
FIG. 1 is a schematic illustration of a brake system with a sectional view of a brake booster according to the present invention a position of rest.

Referring now to the drawings and particularly to FIG. 1, there is shown a brake system 12 with a brake booster 14 that responds to an input force applied to a pedal 16 by an operator to supply pressurized fluid from a first source 18 of pressurized fluid to a first set of wheel brakes 22, 22' and a second set of wheel brakes 24, 24' to effect a brake application. Each of the wheel brakes 22, 22', 24, 24' include a wheel speed sensor 26, a build valve 30 and a decay valve 32 that provides information to an ECU 28 that controls the presentation of an additional pressurized fluid from a second source 36 of pressurized fluid to the first 22, 22' and second 24, 24 set of wheel brakes if needed during a brake application. The presentation of pressurized fluid from the second source 36 to a wheel brake 22, 22', 24, 24' may cause a fluid pressure osculation that could be felt on the brake booster 14; however, the present invention prevents such osculation from being presented to the brake pedal 16.

In more particular detail, as best illustrated in FIG. 1, the brake booster 14 has a housing 40 with a first axial bore 42 therein for receiving a first piston 44 that is separated from the bottom 41 of the axial bore 42 by a first spring 46 to define a first chamber 48, a second piston 50 that is separated from the first piston 44 by a second spring 52 that holds the second piston 50 against a first stop 54 to define a second chamber 56 and a third piston 58 that is separated from the second piston 50 by a third spring 60 that urges the third piston 58 toward a second stop 62 to define a third chamber 64.

The first chamber 48 is connected to a reservoir 66 through a first inlet port 68 and to the first set of wheel brakes 22, 22' through a first outlet port 70 while the second chamber 56 is connected to the second set of wheel brakes 24, 24' through a second outlet port 72 and the third chamber 64 that is connected to the reservoir 66 through a second inlet port 74 and to the second chamber 56 by way of a passage 76 in the second piston 50.

The second axial bore 78 is connected to a supply port 80 through a cross bore 82 and a groove 84 in the second piston 50 to receive pressurized fluid from the first source 18. A check valve 86 defined by a ball 88 and spring 90 is associated with the supply port 80 to prevent the flow of fluid from the second chamber 56 toward the first source 18 of pressurized fluid. The second axial bore 78 opens at one end to the second chamber 56 and is fluidly connected to the passage 76 at the other end. Communication of pressurized fluid from the second axial bore 78 to the passage 76 is under the control of a control valve 92 as a function of an input force supplied by an actuator rod 104 resiliently connected to the third piston 58.

The control valve 92 includes a stem 94 located in the second axial bore 78 with a ball 98 attached thereto that is urged toward a seat 100 by a spring 102 to isolate the fluid under pressure from the first source 18 from the passage 76 in the second piston 50.

The third piston 58 is defined by a cylindrical body 120 that is located in the axial bore 42 and urged by spring 60 toward the third stop 62 to define a false travel or the third chamber 64. The cylindrical body 120 has an extension 121 that projects into the third chamber 64 with an annular rib 106 thereon that engages a stem 200 on a tilt valve 202 located in a second inlet port 74. The cylindrical body 120 has an axial bore 122 that receives a solid end 107 of the actuator rod 104.

Figure 2:
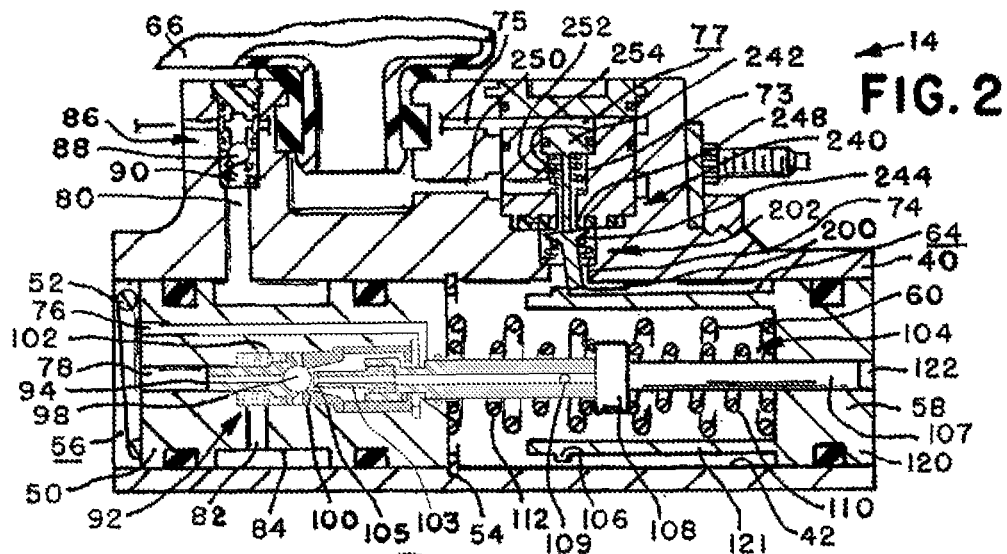
FIG. 2 is an enlarged sectional view of the circumscribed area 2 of FIG. 1.

The solid end 107 of the actuator rod 104 extends to an annular spring retainer 108 from which a hollow stem 103 extends toward the valve seat 100. The hollow stem 103 has a cross bore 109 therein to connect the third chamber 64 with the second axial bore 78 and passage 76 in the second piston 50. An actuation spring 110 is located between the spring retainer 108 and the third piston while a return spring 112 is located between the spring retainer 108 and the second piston 6 50. In a position of rest as illustrated in FIGS. 1 and 2, return spring 112 positions the actuator rod 104 such that the end 105 of the hollow stem 103 is adjacent ball 98 and passage 76 is opened to the third chamber 64 via the hollow stem 103 and reservoir 66 via the inlet port 74.

Communication from reservoir 66 to the first axial bore 42 through the first inlet port 68 and second inlet port 74 are respectively under the control of a first compensation valve 220 that is in axial alignment with axial bore 42 and a second compensation valve 240 that is in radial alignment with the axial bore 42.

The first compensation valve 220 includes a poppet 222 that is attached to a shaft 224 to cage the first spring 46 and a closure spring 226 located between poppet 222 and a retainer 228.

The second compensation valve 240 includes tilt valve 202 located in the second inlet port 74 and a piston 242 located in chamber 77 of control port 73. The tilt valve 202 has a head 244 with a first stem 200 that extends there from into the first axial bore 42, a spring 246 urges the head 244 toward a seat 248. The second inlet port 74 is connected to reservoir 66 by passage 250 such that the third chamber 64 is in communication to receive fluid from reservoir 66 and dispel fluid from chamber 64 to the reservoir 66. The piston 242 which is located in control port 73 is connected by passage 75 to the first source 18 of pressurized fluid, has a second stem 252 that extends there from and engages head 244 on the tilt valve 202 to hold head 244 off seat 248 as long as pressurized fluid is available from the first source 18. A spring 254 is located in the control port 73 to urge the piston 242 away from head 244 whenever pressurized fluid is not available from the first source 18 in chamber 77.

MODE OF OPERATION

The brake system 12 as illustrated in FIGS. 1 and 2 the brake booster 14 is in a position of rest with the first chamber 48 and third chamber 64 in communication with reservoir 66. The first source 18 of pressurized fluid is available at a level determined by a pressure switch that is in communication with the Electronic Control unit (ECU) 28 that controls the activation of a pump and motor that supplied pressurized fluid to an accumulator, the supply port 80 and passage 75 of control chamber 77 in brake booster 14. The pressurized fluid in the supply port 80 is communicated to axial bore 78 in the second piston 50 and acts on ball 98 of control valve 92 to urge the ball 98 toward seat 100 and seal the supply port 80 from the axial bore 42 of the brake booster 14 while the pressurized fluid in control chamber 77 acts on and moves piston 242 such that stem 252 engages head 244 of tilt valve 202 to hold head 244 off seat 248 and provide a flow path between chamber 64 and reservoir 66.

Figure 4:
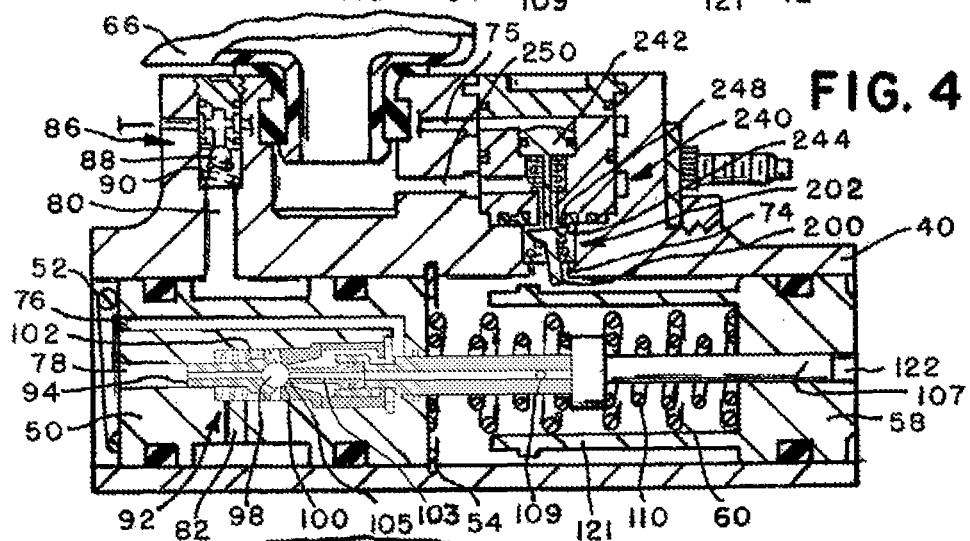
FIG. 4 is an enlarged sectional view of the circumscribed area 4 of FIG. 4.
Figure 6:
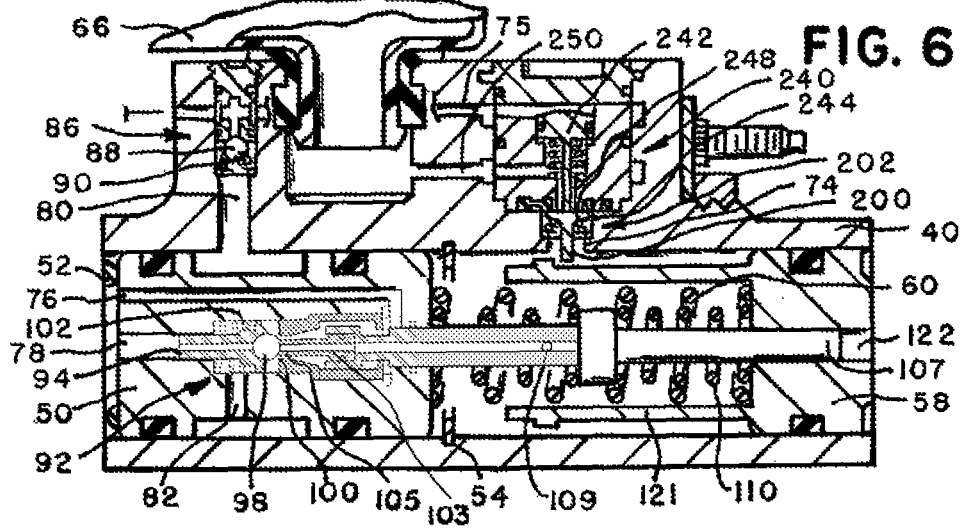
FIG. 6 is an enlarged sectional view of the circumscribed area 6 of FIG. 5.
Figure 3:
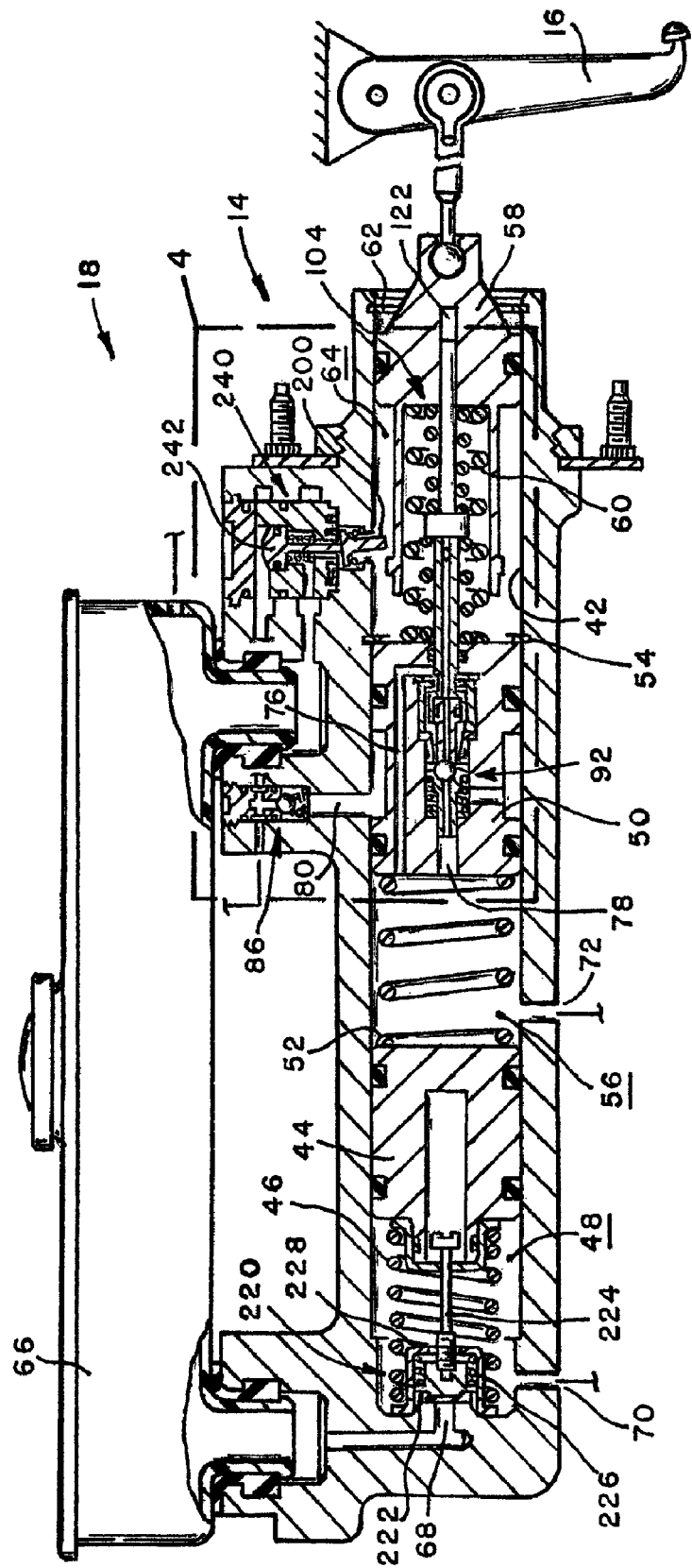
FIG. 3 is a sectional view of the brake booster of FIG. 1 in a actuation mode of operation wherein pressurized fluid available to the brake booster is supplied to the brake system to effect a brake application in response to an operator input force.
Figure 5:
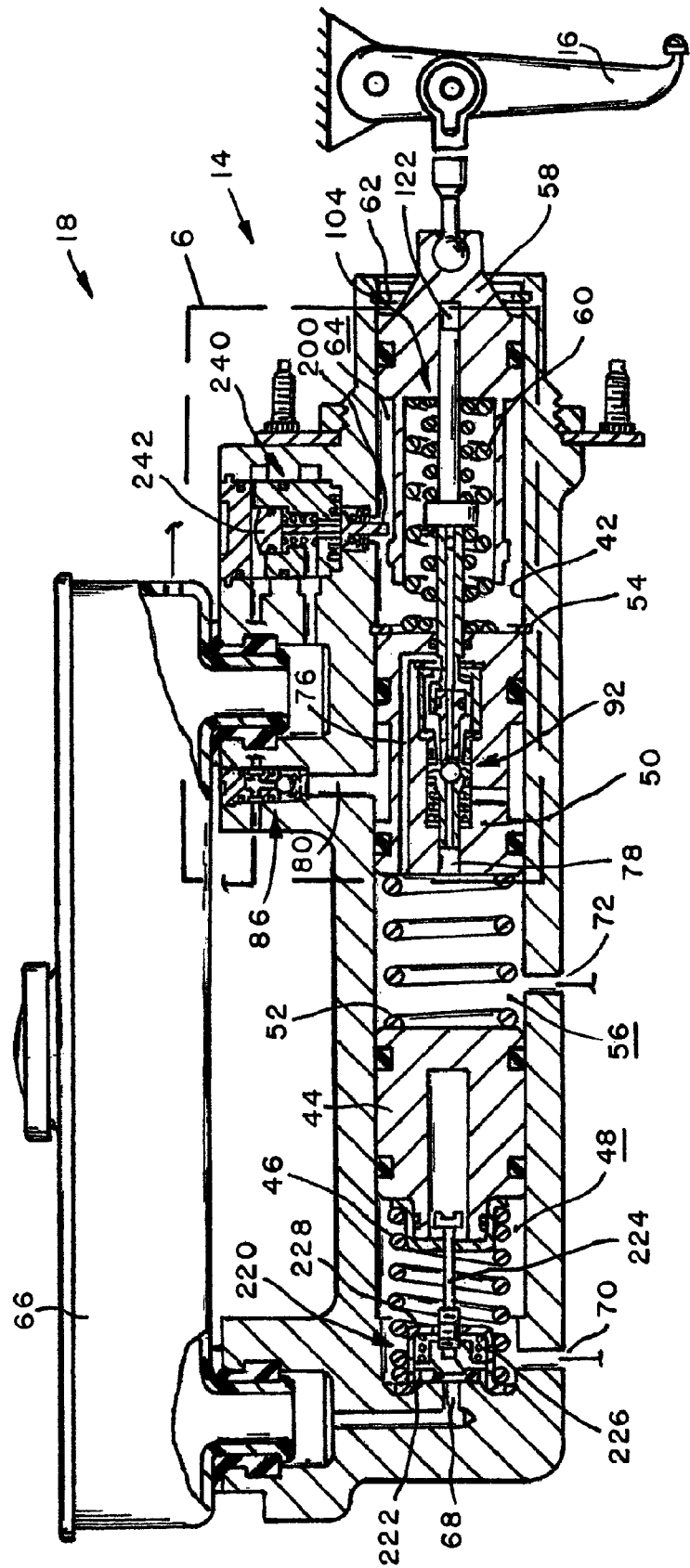
FIG. 5 is a sectional view of the brake booster of FIG. 1 in a manual mode of operation to effect a brake application in response to an operator input force.

When an operator desires to effect a brake application, an input force is applied to pedal 16 that moves the third piston 58 within axial bore 42 as illustrated in FIGS. 3 and 4 by overcoming spring 60 however the second piston 50 remains stationary against the first stop 54. The initial movement of piston 58 provides a force that is applied through actuation spring 110 to move the end 105 of hollow stem 103 on actuation rod 104 into engagement with ball 98 and close communication from passage 76 to chamber 64 and even though rib 106 moves away from stem 200 the tilt valve 202 remains open as it is under the control of piston 242. Once end 105 engages ball 98, further movement by the actuation rod 104 moves ball 98 off seat 100 and pressurized fluid from the first source 18 is allowed to flow past stem 94 and ball 98 and is communicated to the second chamber 56 by way of passage 76 to the second set of wheel brakes 24,24' by way of outlet port 72 and the various conduits illustrated in FIG. 1. The pressurized fluid in the second chamber acts on and moves piston 44 to overcome spring 46 and allow spring 226 to move poppet 224 and close inlet port 68 and pressurize fluid in chamber 46 that is supplied to the first set of wheel brakes 22,22' to effect a brake application corresponding to the input force applied to pedal 16. When the fluid pressure in the second chamber corresponds to the desired brake application, the fluid pressure acts on stem 94 to move ball 98 into engagement with seat 100 and sustain the brake application. During a brake application, each individual wheel sensor 26 supplies the ECU with input signals relating to a current functional operation of the vehicle, in addition to other inputs and data relating to the vehicle including but not limited to: the 8 operation of the motor pump; the pressure of the pressurized supply fluid; dynamic forces experienced by the vehicle; accumulator fluid supply pressure, the level of fluid in a reservoir and etc., all such inputs and data may effect a brake application. Should the ECU determine that an individual brake 22,22', 24, 24' be functioning in a manner different from a desired standard, fluid pressure from a second source 36 developed by a second motor and pump may be added or subtracted from the pressurized fluid presented to an individual brake 22,22', 24, 24'. The adding and subtraction of pressurized fluid to the brake system may be transmitted back to chamber 48 or chamber 56 of the brake booster 14 provided, however, the end 105 of the hollow stem 103 of the actuation rod 104 may be moved away from ball 98 and pressurized fluid dispelled into chamber 64 while the actuation spring 110 absorbs any such change and as a result the pedal 16 does not oscillate or feel any change in the braking application.

When a brake application is completed, return spring 60 moves piston 58 against stop 62 and rib 106 engages stem 200 of tilt valve 202 which is already off seat 248 to assure chamber 64 is in communication with reservoir 66. On termination of the input force on the third piston 58, return spring 112 moves end 105 of the hollow stem 103 of the actuation rod 104 away from ball 98 and opens communication from the second chamber 56 to the reservoir 66 by way of passage 76, hollow stem 103, cross bore 109 and chamber 64.

In an event pressurized fluid is not available from the first source 18, spring 254 moves piston 242 away from head 244 and brings the tilt valve 202 under the control of the position of the third piston 58. Thereafter should an operator desire to effect a brake application, an input force applied to pedal 16 moves piston 58 within bore 42 such that projection or rib 106 on extension moves away from stem 200 on tilt valve 202 and spring 246 moves head 244 against seat 248 to seal chamber 64 from reservoir 66 and create a hydraulic lock. The hydraulic lock transmits an actuation force corresponding to the force applied to the third piston 58 by the pedal 16 to move the second piston 50 away from stop 54 and pressurize fluid in chamber 56 that is communicated through outlet port 72 to the set of wheel brakes 24,24' to initiate a brake application. The build up of fluid pressure in chamber 56 acts on and moves piston 44 to close the communication through port 68 and pressurize fluid in chamber 48 that is communicated through outlet port 70 to the set of wheel brakes 22,22' to complete the manual brake application.

What is claimed is:

1. A brake booster for use in a brake system having
a housing with a first axial bore therein for receiving a first piston that is separated from the bottom of the axial bore by a first spring to define a first chamber,
a second piston that is separated from the first piston by a second spring to define a second chamber and
a third piston that is separated from the second piston by a third spring to define a third chamber,
said first chamber being connected to a reservoir through a first inlet port and to a first set of wheel brakes through a first outlet port,
said second chamber being connected to a second set of wheel brakes through a second outlet port,
said third chamber being connected to the reservoir through a second inlet port and to the second chamber through a first passage in the second piston,
said second piston having a second axial bore connected to a source of pressurized fluid through a supply port, the supply port being fluidly connected to the second axial bore,
a control valve located in the second axial bore for controlling communication of pressurized fluid from the supply port to the first passage in response to an input force supplied by an actuator rod connected to the third piston in response to a manual brake force applied to a pedal by an operator, and
compensation valve means located in the second inlet port for controlling fluid communication between the reservoir and the third chamber as a function of pressurized fluid available from the source and the position of the third piston,
said brake booster being characterized by the second piston being held against a stop when pressurized fluid is supplied to the first passage to effect a first brake application and in an absence of pressurized fluid available from the source, the compensation valve closes and fluid in the third chamber acts on and moves the second piston away from the stop as a function of movement of the third piston by the manual brake force to immediately pressurize fluid in the second chamber and effect a second brake application.

2. The brake booster as recited in claim 1 further characterized by a check valve associated with the supply port to prevent fluid from flowing from the second chamber toward the source for pressurized fluid.

3. The brake booster as recited in claim 2 wherein said compensation valve means is characterized by a tilt valve having a head with a first stem that extends there from into the first axial bore, a fourth spring that urges the head toward a seat and a piston having a second stem that extends there from that engages said head and a fifth spring that urges the piston toward a second stop, said piston responding to the source of pressurized fluid by acting on and holding said head off the seat to provide free communication between the third chamber and the reservoir irrespective of the position of the third piston and in an absence of available pressurized fluid from the source, said fourth spring moving said piston toward the second stop to allow said fifth spring to move said head against said seat to seal the third chamber and thereafter develop a hydraulic lock in the third chamber such that on movement of the third piston by the manual brake force, the second piston moves away from the first stop to correspondingly pressurizes fluid in the second chamber to effect the second brake application.

4. The brake booster as recited in claim 3 wherein in an absence of a manual brake force, the third spring moves the third piston to a position of rest and brings a projection on the third piston into engagement with the stem of the tilt valve to provide for free communication between the third chamber and the reservoir through the second inlet port.

5. The brake booster as recited in claim 2 wherein the pressurized fluid in the second chamber acts on the control valve and is balanced with the input force applied to the control valve through the actuator rod.

6. The brake booster as recited in claim 1 wherein the control valve responds to fluid pressure changes in the pressurized fluid supplied to the wheel brakes by adding and subtracting fluid from the second chamber.

7. The brake booster as recited in claim 5 the third piston is not effected by adding and subtracting of fluid to the second chamber but remains in a position as determined by the manual brake force.

8. The brake booster as recited in claim 1 wherein said third spring is compressed into the third chamber by the manual brake force and the actuator rod resiliently moves to provide the control valve with the input force to effect the brake application.

* * * * *